UNITED STATES PATENT OFFICE.

DAVID HANNA, OF JERSEY CITY, ASSIGNOR TO HENRY C. OHLEN, OF MADISON, NEW JERSEY.

IMPROVEMENT IN PROCESSES FOR RESTORING AND PURIFYING CAUSTIC ALKALI.

Specification forming part of Letters Patent No. 156,483, dated November 3, 1874; application filed October 17, 1874.

*To all whom it may concern:*

Be it known that I, DAVID HANNA, of Jersey City, Hudson county, New Jersey, have invented a new and Improved Process for Purifying and Restoring Caustic Alkali, of which the following is a specification:

I propose to purify and restore for use the spent caustic alkali employed for purifying petroleum, and now allowed to run to waste. For this purpose I gather the lye in iron tanks as it escapes from the factory, and first subject it to a general agitation in order to break up and throw off the gaseous residuum it retains from the oils; then pass it through a very fine filter to further separate the remaining portions of the same not thrown off by the agitating process; then I run it into evaporating-pans, where it undergoes further agitation, and is heated to the boiling-point as quickly as possible, by which all the remaining gaseous matters are finally thrown up to the top, and by skimming during the boiling process the vitriol and all other impurities are expelled. The pure alkali is then kept boiling till reduced to 30° or 40° gravity, and is then drawn off into settling-tanks, and a quantity of finely-pulverized quicklime added; also a little ammonia is sprinkled over the top of the settling-tank. In this condition the alkali is allowed to stand for a few days to settle, and to increase its caustic property.

The lime, passing from the top of the tank to the bottom, carries with it all sediment, and leaves it white and pure, and as good as when first made from caustic soda, not only for refining oil, but for bleaching and making soap. The alkali is then drawn off, and put up in packages of any kind.

While I prefer to use the ammonia to improve the clearness and brilliancy, it is not absolutely necessary to the success of the operation.

The proportions will be about one pound of lime to four gallons, and of ammonia about one pound to forty gallons of the lye; but this will be regulated according to the judgment of the operator, and by the circumstances of the case.

Having thus described my invention, I claim as new, and desire to secure by Letters Patent—

The process of purifying and restoring waste caustic alkali by expelling the gaseous residuum in the manner described, and settling with quicklime and ammonia, or lime alone, substantially as specified.

DAVID HANNA.

Witnesses:
T. B. MOSHER,
ALEX. F. ROBERTS.